A. B. COX.
TRACTOR.
APPLICATION FILED MAY 24, 1920.
1,397,314.
Patented Nov. 15, 1921.
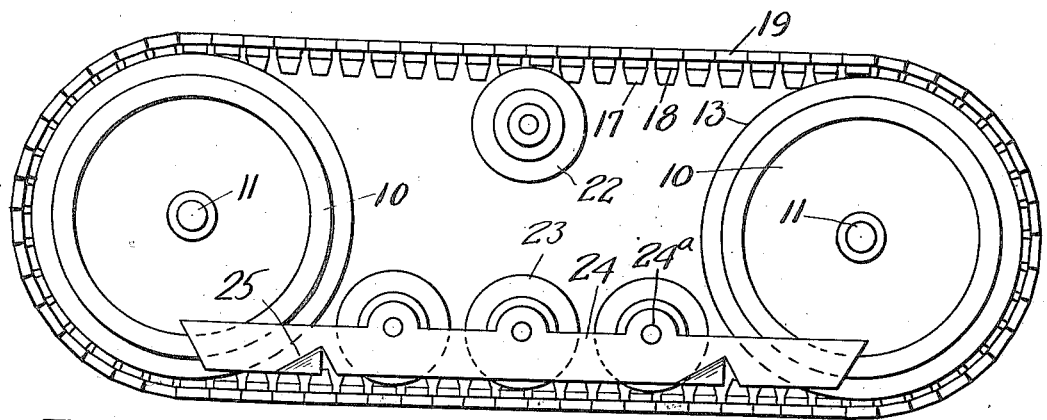
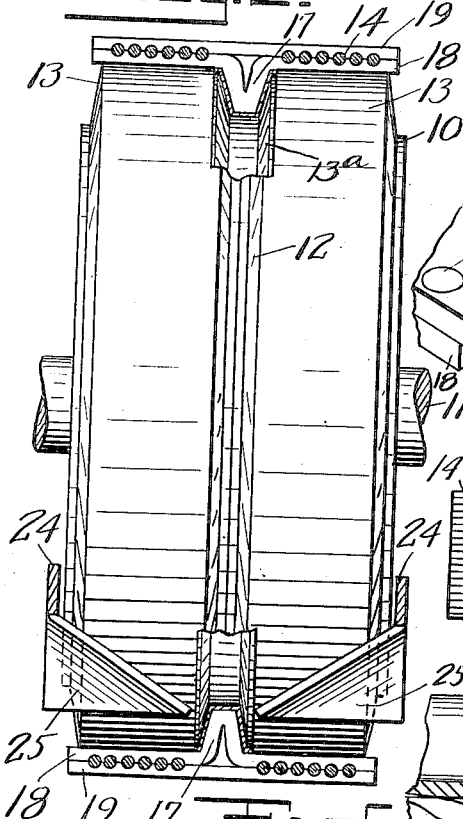
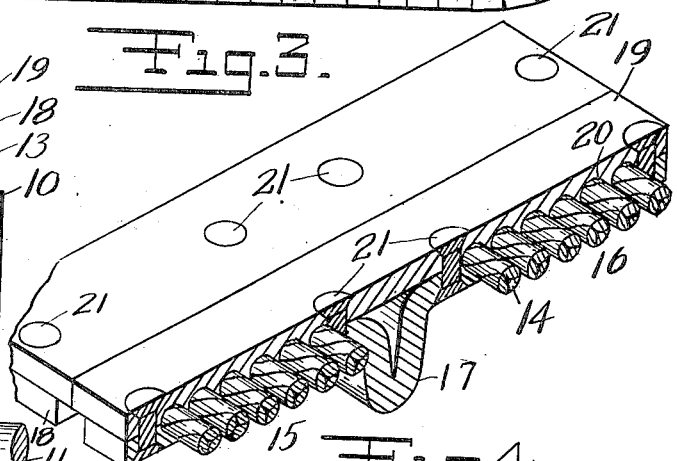
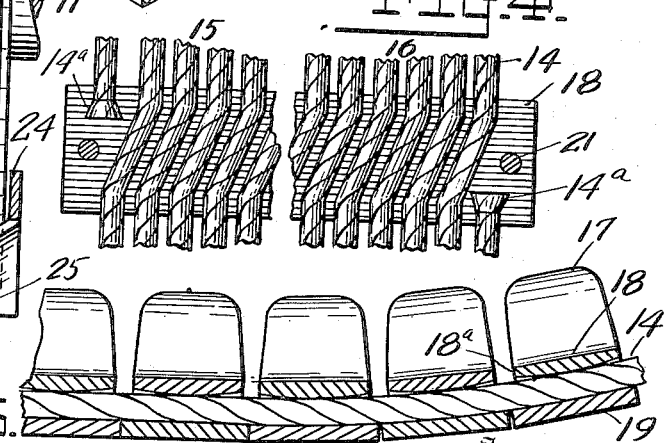
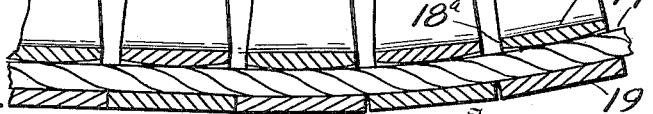
Inventor
Abraham B. Cox.
By his Attorney,
W. D. Hutchinson.

UNITED STATES PATENT OFFICE.

ABRAHAM B. COX, OF CHERRY VALLEY, NEW YORK.

TRACTOR.

1,397,314.   Specification of Letters Patent.   Patented Nov. 15, 1921.

Application filed May 24, 1920. Serial No. 383,756.

*To all whom it may concern:*

Be it known that I, ABRAHAM B. COX, a citizen of the United States, and a resident of Cherry Valley, Otsego county, New York, have invented a new and useful Improvement in Tractors, of which the following is a full, clear, and exact description.

My invention relates to improvements in tractors, and the object of my invention is to produce a strong, simple, mobile and reliable tractor, which can be run to advantage on rough and uneven ground, and which is capable of operating under relatively high speed. My invention is also intended to produce a tractor in which the track or tread is flexible and is connected with the track wheels in such a manner as to be sure to retain its position, and in which the liability of the track leaving the wheels is reduced to a minimum. My invention is also intended to produce a tractor in which the movable track is made up of comparatively narrow elements having an endless cable belt as a carrier, so that the track will easily conform to the wheels and will run smoothly with comparatively little noise, and with little vibration. The invention is also intended to produce a tractor of this character in which the parts are not likely to become clogged with dirt or mud, and in which special provision is provided for keeping them relatively clean.

Reference is to be had to the accompanying drawings forming a part of this specification, in which similar reference characters indicate corresponding parts in all the views.

Figure 1 is a side elevation of the tractor element embodying my invention.

Fig. 2 is a cross section of the same.

Fig. 3 is a broken detail perspective showing the manner of securing the binding plates to the cables or carrier.

Fig. 4 is a broken detail plan of a part of the cable belt and one of the underlying plates, and Fig. 5 is an enlarged broken longitudinal section of a part of the track.

In the drawing I have shown a single tractor element comprising spaced track wheels connected by a flexible track, but it will be understood that these elements can be coupled up in pairs or more if desired. Each tractor is provided with a pair of wheels 10 spaced apart one ahead of the other and in alinement, these being provided with axles 11, and as stated the axles can carry two or more sets of wheels if desired. Each track wheel is provided with a circumferential groove 12 which is preferably at the center of the wheel, and serves as a guide for the track to be presently described, so that the track cannot leave the wheels unless it breaks. This groove can be produced in any convenient way, but I prefer to have it between resilient tire portions or members 13 which can be of solid rubber or composition, and this arrangement provides the resilient support for the track, and the latter will hug it closely. However, the invention is not confined to the resilient tread portion.

The track is provided with a series of cables 14 preferably of wire, and arranged closely together so as to form a strong flexible carrier for the track, and these cables or belts are preferably in sections 15 and 16 on opposite sides of the guiding element or member 17. This element 17 is preferably in the form of a boss produced by bending the inner binding plates 18, and the cable belts are clamped by the inner binding plates 18, and the outer plates 19. The inner plates are preferably spaced apart slightly so that they will readily follow the contour of the track wheels, and both inner and outer plates are preferably, though not necessarily, grooved to receive the cables 14 so that the plates can meet and hold the cables firmly between them. The plates can be fastened together in any convenient way, as by rivets 21 or the like, and the outer plates 19 can meet or substantially meet if desired. It will be seen that the inner plates can be bent in the center to produce the guiding element 17 which fits nicely in the groove 12 of the track wheels, and when thus formed, the track comprising the cables 14 and the inner and outer binding plates 18 and 19, is exceedingly strong and flexible, follows the track wheels closely, and cannot possibly leave them because of the guiding device hereinabove described.

The cables can be easily and securely arranged between the plates by having the ends of the cables enlarged as shown at 14$^a$ in Fig. 4, and held in corresponding sockets between the plates 18 and 19, then the cables of each section 14—15 can be spirally wound to the desired length, and secured by clamping the plates upon them as already described. Attention is called also to the fact that the inner plates 18 can be curved slightly as shown at 18$^a$ in Fig. 5, so that they will readily follow the contour of the wheels without nipping the cables too tightly at the edges. It will be understood, also, that in case the tread 13 of the wheels is non-metallic, the inner parts of each tread portion can be armored where it contacts with the guiding members 17 as shown at 13ª in Fig. 5.

By having the track formed of the meeting plates which inclose the cables between them, I get a strong flexible compact track which is not likely to be interfered with in its operation by mud or dust, but as a further precaution against the accumulation of mud or other material on the track, I provide cleaning devices which lie longitudinally of the lower member of the track, in the form of shares or scrapers which will throw loose material from the track to the sides thereof. This arrangement can be conveniently carried out by the arranging strips or plates 24 at the sides of the lower track member and just above the upper surface of said member, the plates having shares 25 which are bent inward over the track as shown clearly in Fig. 2, and are arranged at an inclination so that any of the material which falls on the track will be deflected to one side by the shares. The plates 24 can be supported in any convenient way, as for instance on the axles 24ª of the wheels 24 which are arranged to run on and brace the lower member of the track, while a similar wheel 22 can be arranged near the top member of the track to form a support therefor. A number of these wheels 22 can be provided but the arrangement of wheels 22 and 23 is not shown in detail, as this feature of the tractor is not claimed as new. The wheels can be supported in any convenient way.

From the foregoing description it will be seen that I have devised a very simple, powerful and flexible tractor, adapted to run at relatively high speed on any surface where a tractor would be employed, which is not likely to get out of order, and which has the special advantage that the track cannot possibly leave its track wheels.

It will be further noticed that by having the grooved track wheels and the track element provided with guiding devices to enter the grooves, I can leave the edges of the track plain so that they are not likely to accumulate dirt or refuse, and that this construction also provides for the easy cleaning off of any material which may fall upon the lower member of the track when the latter is moving.

With tractors as generally made, the plates of the track have a tendency to bend; but with my track it will be noticed that the bending of the inner plates to form the guides 17, also greatly stiffens the plates so that they are not liable to buckle. Another advantage of this form of tractor is that with the cables and plates as arranged the track wheels 10 can be forced apart so that the track can be made pretty stiff, and will therefore work to advantage; but with chain tracks this cannot be done because of the excessive friction if the chains are too taut.

I claim:—

A tractor having wheels spaced apart and provided with circumferential grooves near the center thereof, and a track comprising cables in close connection, and outer and inner plates fitting over the said cables and clamping them between them, the inner plates being formed with inturned bends which fit in the grooves of the wheels.

ABRAHAM B. COX.

Witnesses:
WARREN B. HUTCHINSON,
M. G. O'DONNELL.